(12) United States Patent
Kawase

(10) Patent No.: US 10,752,292 B2
(45) Date of Patent: Aug. 25, 2020

(54) VEHICLE LOWER SECTION STRUCTURE

(71) Applicant: TOYOTA JIDOSHA KABUSHIKI KAISHA, Toyota-shi (JP)

(72) Inventor: Kyosuke Kawase, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/948,239

(22) Filed: Apr. 9, 2018

(65) Prior Publication Data
US 2018/0312199 A1 Nov. 1, 2018

(30) Foreign Application Priority Data

Apr. 28, 2017 (JP) .................................. 2017-090782

(51) Int. Cl.
| | |
|---|---|
| *B62D 21/15* | (2006.01) |
| *B62D 21/02* | (2006.01) |
| *B60K 1/04* | (2019.01) |
| *B62D 25/02* | (2006.01) |
| *B62D 25/20* | (2006.01) |
| *B62D 29/00* | (2006.01) |

(52) U.S. Cl.
CPC .............. *B62D 21/157* (2013.01); *B60K 1/04* (2013.01); *B62D 21/02* (2013.01); *B62D 25/025* (2013.01); *B62D 25/2036* (2013.01); *B62D 29/008* (2013.01); *B60K 2001/0438* (2013.01); *B60K 2001/0472* (2013.01); *B60Y 2306/01* (2013.01)

(58) Field of Classification Search
CPC . B62D 21/157; B62D 25/025; B62D 25/2036
See application file for complete search history.

(56) References Cited

U.S. PATENT DOCUMENTS

| | | | | |
|---|---|---|---|---|
| 5,352,011 A | * | 10/1994 | Kihara | ................... B62D 23/00 296/203.03 |
| 6,227,322 B1 | | 5/2001 | Nishikawa | |
| 8,007,032 B1 | * | 8/2011 | Craig | ................... B62D 25/025 296/187.12 |

(Continued)

FOREIGN PATENT DOCUMENTS

| | | |
|---|---|---|
| CN | 105848943 A1 | 8/2016 |
| EP | 2 030 872 A1 | 3/2009 |

(Continued)

*Primary Examiner* — Hilary L Gutman
(74) *Attorney, Agent, or Firm* — Oblon, McClelland, Maier & Neustadt, L.L.P.

(57) ABSTRACT

There is provided a vehicle lower section structure including a pair of rockers respectively provided at both vehicle width direction outer sides of a floor panel of a vehicle so as to extend in a vehicle front-rear direction, each of the rockers being configured including: an outer section that is positioned at the vehicle width direction outer side; an inner section that is integrally formed with the outer section, that is positioned at a vehicle width direction inner side, and that forms a closed cross-section section together with the outer section; and a first shock absorption section that is integrally formed with the outer section and the inner section, and that spans in the vehicle width direction between the outer section and the inner section within the closed cross-section section.

2 Claims, 10 Drawing Sheets

(56) References Cited

U.S. PATENT DOCUMENTS

| | | | |
|---|---|---|---|
| 8,268,469 B2* | 9/2012 | Hermann | H01M 2/1077 |
| | | | 429/62 |
| 8,561,743 B2* | 10/2013 | Iwasa | B60K 1/04 |
| | | | 180/68.5 |
| 8,939,246 B2* | 1/2015 | Yamaguchi | B60K 1/04 |
| | | | 180/68.5 |
| 9,505,442 B2* | 11/2016 | Wu | B62D 21/157 |
| 9,809,101 B2* | 11/2017 | Ikeda | B62D 29/001 |
| 10,259,506 B2* | 4/2019 | Ayukawa | B62D 25/2036 |
| 10,286,956 B2* | 5/2019 | Keuthage | B62D 25/025 |
| 2008/0106119 A1* | 5/2008 | Ma | B62D 21/157 |
| | | | 296/187.12 |
| 2009/0146457 A1 | 6/2009 | Kanagai et al. | |
| 2012/0161472 A1* | 6/2012 | Rawlinson | B60K 1/04 |
| | | | 296/187.08 |
| 2013/0088044 A1 | 4/2013 | Charbonneau et al. | |
| 2013/0088045 A1 | 4/2013 | Charbonneau et al. | |
| 2019/0092395 A1* | 3/2019 | Makowski | B62D 25/2036 |
| 2019/0118868 A1* | 4/2019 | Kellner | B62D 27/023 |
| 2019/0248418 A1* | 8/2019 | Sono | B62D 25/025 |
| 2019/0248419 A1* | 8/2019 | Mukaigawa | B62D 25/025 |
| 2020/0023905 A1* | 1/2020 | Kawase | B62D 25/025 |
| 2020/0062311 A1* | 2/2020 | Kawase | B60K 1/04 |

FOREIGN PATENT DOCUMENTS

| | | | |
|---|---|---|---|
| EP | 2468609 A2 * | 6/2012 | B60K 1/04 |
| EP | 3360761 B1 * | 7/2019 | B62D 25/2036 |
| GB | 2568538 A * | 5/2019 | B62D 21/157 |
| JP | 07156831 A * | 6/1995 | B62D 21/157 |
| JP | 2011-126452 | 6/2011 | |
| JP | 2013-133046 | 7/2013 | |

* cited by examiner

VEHICLE LOWER SECTION STRUCTURE

CROSS-REFERENCE TO RELATED APPLICATION

This application is based on and claims priority under 35 USC 119 from Japanese Patent Application No. 2017-090782 filed on Apr. 28, 2017, the disclosure of which is incorporated by reference herein.

BACKGROUND

Technical Field

The present disclosure relates to a vehicle lower section structure.

Related Art

Japanese Patent Application Laid-Open (JP-A) No. 2013-133046 discloses technology relating to a vehicle lower section structure to support a battery unit, this being one drive power supply device, at a vehicle lower side of a floor panel.

Specifically, in this related art, an angular tube shaped battery side-frame is disposed between a rocker and the battery unit, and is attached to the rocker and the battery unit so as to be adjacent to both.

When impact load is input to the rocker in a side-on collision of the vehicle, and the rocker deforms toward the vehicle width direction inner side (inner side of the rocker), pulling force acts at the vehicle width direction inner side of the rocker. In the related art described above, since the battery side-frame is provided adjacent to the rocker, compression force acts on the rocker side of the battery side-frame.

Namely, in JP-A No. 2013-133046, stress acting on both the rocker and the battery side-frame is cancelled out by the pulling force and compression force acting at adjacent locations. This thereby suppresses deformation of the rocker and the battery side-frame, thereby suppressing the rocker from intruding (also referred to as folding inward) toward the vehicle width direction inner side.

However, in a side collision with a pole, when a localized large load is input to the rocker, there is a possibility that the rocker might fold inward.

SUMMARY

In consideration of the above circumstances, the present disclosure provides a vehicle lower section structure capable of absorbing impact energy more effectively, and suppressing inward folding of a rocker.

A vehicle lower section structure according to a first aspect of the present disclosure includes a pair of rockers respectively provided at both vehicle width direction outer sides of a floor panel of a vehicle so as to extend in a vehicle front-rear direction. Each of the rockers is configured including an outer section, an inner section, and a first shock absorption section. The outer section is positioned at the vehicle width direction outer side of the rocker. The inner section is integrally formed with the outer section, is positioned at the vehicle width direction inner side of the rocker, and forms a closed cross-section section together with the outer section. The first shock absorption section is integrally formed with the outer section and the inner section, and spans in the vehicle width direction between the outer section and the inner section within the closed cross-section section.

In the vehicle lower section structure according to the first aspect of the present disclosure, the rockers are provided respectively at both vehicle width direction outer sides of the floor panel of the vehicle. Each of the rockers extends in the vehicle front-rear direction. In each rocker, the outer section positioned at the vehicle width direction outer side and the inner section positioned at the vehicle width direction inner side are integrally formed to one another such that the outer section and the inner section form the closed cross-section section. Note that "integrally formed" here refers to the outer section and the inner section being formed as a single unit by extrusion, drawing, or the like.

In the present disclosure, in the rockers, forming the outer section and the inner section integrally to one another enables the strength of the rockers to be increased in comparison to cases in which, for example, the rockers are formed by joining together two panels configuring an outer section and an inner section.

Welding, fastening, or the like would be necessary in order to join together two panels configuring an outer section and an inner section of a rocker. However, in the present disclosure, the outer section and the inner section are formed integrally to one another, rendering such work unnecessary, and thus enabling a commensurate reduction in costs.

Moreover, the first shock absorption section is integrally formed together with the outer section and the inner section within the closed cross-section section of each rocker. The first shock absorption section spans in the vehicle width direction between the outer section and the inner section within the closed cross-section section. Accordingly, part of an impact load input to the rocker in a side-on collision of the vehicle (referred to hereafter as a "vehicle side collision") is transmitted toward the vehicle width direction inner side through the first shock absorption section.

Generally, from the perspective of protecting the interior of the vehicle cabin, the vehicle width direction inner side of a rocker will have high rigidity. Accordingly, when load is transmitted toward the vehicle width direction inner side through the first shock absorption section, a reaction force is obtained from the rocker. The first shock absorption section therefore plastically deforms, absorbing impact energy.

Note that for example in cases in which a shock absorption member is configured by a shock absorption section provided separately to a rocker, when fitting the shock absorption member inside the closed cross-section section of the rocker, it is necessary to provide ribs or the like to restrict movement of the shock absorption member inside the closed cross-section section in order to prevent the position of the shock absorption member from shifting when subjected to impact.

When such ribs are provided inside the closed cross-section section of the rocker, during plastic deformation of the shock absorption member when the rocker is input with impact load, there is a possibility that the ribs might obstruct the plastic deformation of the shock absorption member. When the plastic deformation of the shock absorption member is obstructed in this manner, what may be referred to as incomplete crushing arises, resulting in a reduction in the amount of energy absorption by the rocker commensurate with the incomplete crushing. Namely, it might not be possible to absorb impact energy efficiently.

By contrast, in the present disclosure, the outer section and the inner section are integrally formed in the first shock absorption section, and so there is no need to provide ribs or the like, thereby enabling incomplete crushing of the first shock absorption section to be suppressed. Namely, the impact energy of impact load can be effectively absorbed, enabling inward folding of the rocker to be suppressed even when the rocker is locally input with a large load, such as in a side collision with a pole.

A vehicle lower section structure according to a second aspect of the present disclosure is the vehicle lower section structure according to the first aspect, wherein a storage battery is provided at a vehicle lower side of the floor panel, and the first shock absorption section is disposed at a position overlapping with the storage battery in vehicle side view.

Generally, a storage battery installed in a vehicle is set so as to have high rigidity. Accordingly, in the vehicle lower section structure according to the second exemplary embodiment of the present disclosure, the storage battery is provided at the vehicle lower side of the floor panel, and the first shock absorption section is disposed at a position overlapping with the storage battery in vehicle side view. Accordingly, part of an impact load input to the rocker in a vehicle side collision is transmitted to the storage battery through the first shock absorption section.

As described above, since the storage battery is set so as to have high rigidity, when the storage battery is input with impact load, a reaction force is obtained from the storage battery. This causes the first shock absorption section to plastically deform, thereby absorbing impact energy. Namely, impact load can be reduced even with a short stroke.

Moreover, impact load transmitted to the storage battery through the first shock absorption section of the rocker obtains a reaction force from the storage battery, thereby enabling the rocker to be suppressed from intruding toward the vehicle width direction inner side (also referred to as inward folding).

Note that the "storage battery" is, for example, a lithium ion battery, a nickel-hydrogen battery, or a silicon battery. Moreover, "storage battery" refers to, for example, plural battery modules in a state housed inside a case (referred to hereafter as a "battery pack").

A vehicle lower section structure according to a third aspect of the present disclosure is the vehicle lower section structure according to the first aspect, wherein a floor cross member is disposed above the floor panel so as to span between the pair of rockers in the vehicle width direction, and the first shock absorption section is disposed at a position overlapping with the floor cross member in vehicle side view.

In the vehicle lower section structure according to the third aspect of the present disclosure, the floor cross member is disposed above the floor panel so as to span between the pair of rockers in the vehicle width direction. The first shock absorption section is disposed at a position overlapping with the floor cross member in vehicle side view. Accordingly, in a vehicle side collision, part of the impact load input to the rocker is transmitted to the floor cross member through the first shock absorption section.

When impact load is input to the floor cross member, a reaction force is obtained from the floor cross member (strictly speaking, through the floor cross member from the rocker on the opposite side to the rocker to which the impact load has been input). This causes the first shock absorption section to plastically deform, thereby absorbing impact energy.

A vehicle lower section structure according to a fourth aspect of the present disclosure is the vehicle lower section structure according to the second aspect, wherein a floor cross member is disposed above the floor panel so as to span between the pair of rockers in the vehicle width direction. Moreover, a second shock absorption section is provided to each rocker at a position overlapping with the floor cross member in vehicle side view. The second shock absorption section is integrally formed with the outer section and the inner section and spans in the vehicle width direction between the outer section and the inner section within the closed cross-section section.

In the vehicle lower section structure according to the fourth aspect of the present disclosure, the floor cross member is disposed above the floor panel so as to span between the pair of rockers in the vehicle width direction. The second shock absorption section is integrally formed with the outer section and the inner section of each rocker. The second shock absorption section spans in the vehicle width direction between the outer section and the inner section of the rocker within the closed cross-section section of the rocker, and is provided at a position overlapping with the floor cross member in vehicle side view.

Namely, the first shock absorption section and the second shock absorption section span in the vehicle width direction inside the closed cross-section section of each rocker. The first shock absorption section and the second shock absorption section are integrally formed together with the outer section and the inner section. The first shock absorption section is disposed at a position overlapping with the storage battery in vehicle side view, and the second shock absorption section is disposed at a position overlapping with the floor cross member in vehicle side view.

Accordingly, in a vehicle side collision, part of an impact load input to the rocker is transmitted to the storage battery through the first shock absorption section, and part of the impact load input to the rocker is transmitted to the floor cross member through the second shock absorption section. When the impact load is input to the storage battery, a reaction force is obtained from the storage battery, and when the impact load is input to the floor cross member, a reaction force is obtained from the floor cross member (strictly speaking, through the floor cross member from the rocker on the opposite side to the rocker to which the impact load has been input). This causes the first shock absorption section and the second shock absorption section to plastically deform, thereby absorbing impact energy.

Moreover, in a vehicle side collision, both a load transmission route transmitting load through the first shock absorption section of the rocker to the storage battery, and a load transmission route transmitting load through the second shock absorption section of the rocker to the floor cross member, can be formed. This thereby enables impact load input to the rocker to be dispersed.

Namely, in the present disclosure, the first shock absorption section and the second shock absorption section are provided within the closed cross-section section of each rocker, and the first shock absorption section and the second shock absorption section are disposed so as to respectively overlap with the storage battery and the floor cross member in vehicle side view. Reaction force from the storage battery and the floor cross member is utilized to suppress inward folding of the rocker.

As described above, as a result of suppressing incomplete crushing of the first shock absorption section, the vehicle lower section structure according to the first aspect of the present disclosure exhibits the excellent advantageous effect of being capable of more effectively absorbing impact energy and suppressing inward folding of the rockers.

The vehicle lower section structure of the second aspect of the present disclosure exhibits the excellent advantageous effect of being capable of obtaining a reaction force from the storage battery and causing the first shock absorption section to plastically deform, thereby absorbing impact energy.

The vehicle lower section structure according to the third aspect of the present disclosure exhibits the excellent advantageous effect of being capable of obtaining a reaction force from the floor cross member and causing the first shock absorption section to plastically deform, thereby absorbing impact energy.

The vehicle lower section structure according to the fourth aspect of the present disclosure exhibits the excellent advantageous effect of being capable of obtaining a reaction force from the storage battery and obtaining a reaction force from the floor cross member, and causing the first shock absorption section and the second shock absorption section to plastically deform, thereby absorbing impact energy.

BRIEF DESCRIPTION OF THE DRAWINGS

Exemplary embodiments of the present disclosure will be described in detail based on the following figures, wherein.

DETAILED DESCRIPTION

Figure 1:
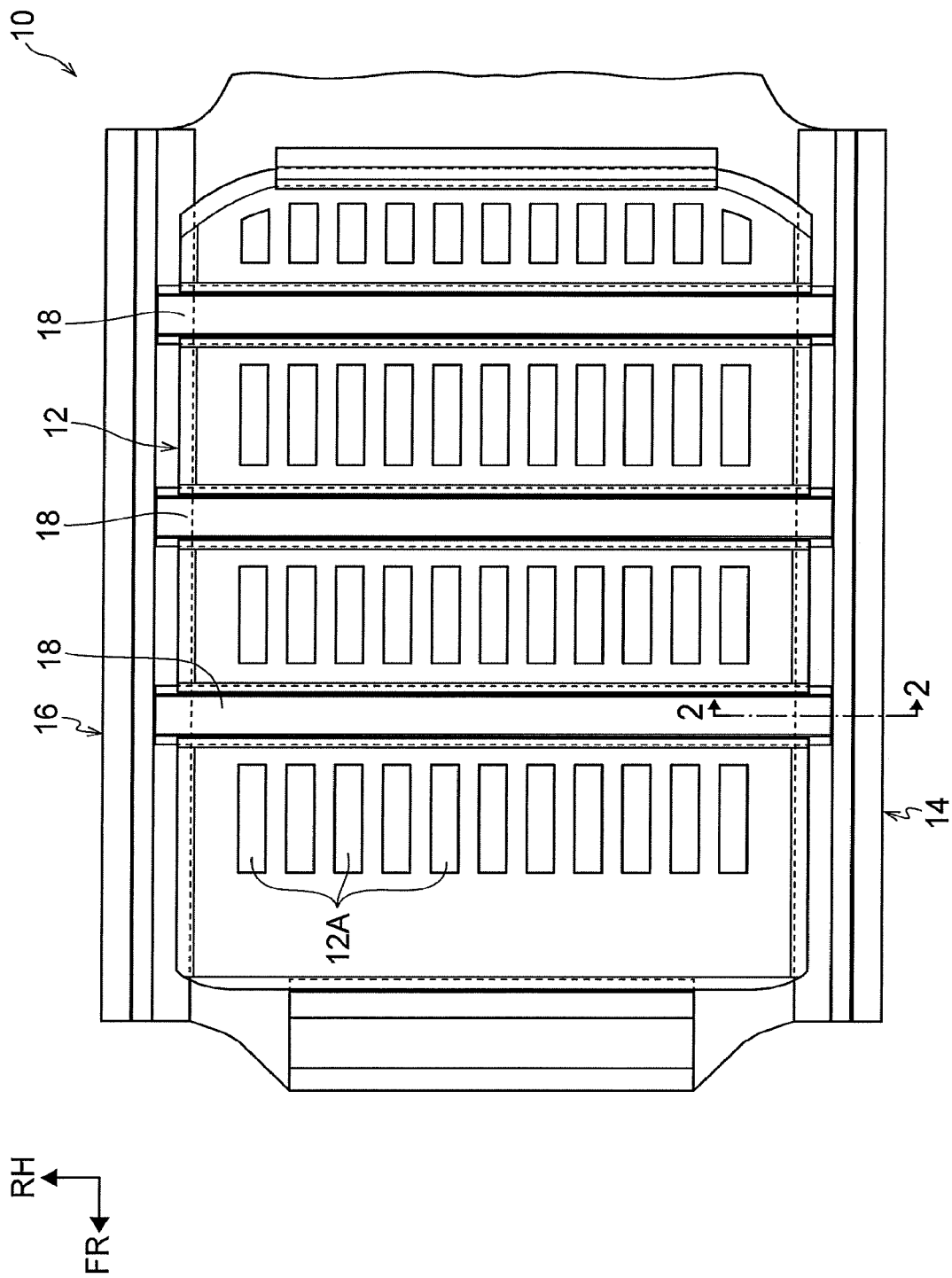
FIG. 1 is a plan view of a vehicle lower section applied with a vehicle lower section structure according to a first exemplary embodiment.

Explanation follows regarding a vehicle lower section structure according to exemplary embodiments of the present disclosure, with reference to the drawings. In the drawings, the arrow FR, the arrow UP, and the arrow RH respectively indicate the front direction, upward direction, and right direction as appropriate in a vehicle applied with a vehicle floor structure according to an exemplary embodiment of the present disclosure. In the following explanation, unless specifically stated otherwise, reference simply to the front-rear, upward and downward, and left and right directions refers to the front and rear in a vehicle front-rear direction, upward and downward in a vehicle vertical direction, and the left and right when facing forward.

First Exemplary Embodiment

Vehicle Lower Section Structure Configuration

Figure 2:
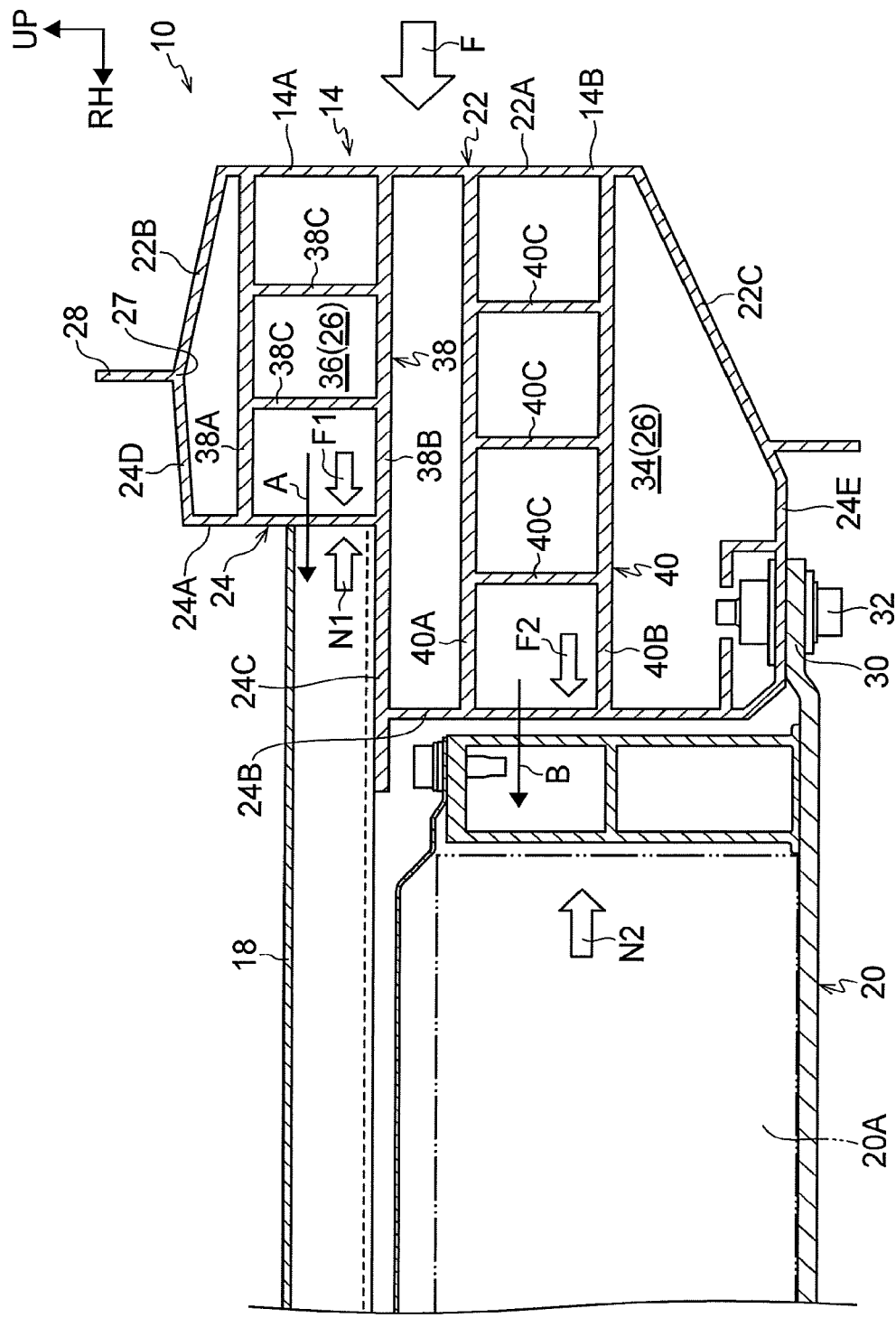
FIG. 2 is a cross-section taken along line 2-2 in FIG. 1.

First, explanation follows regarding configuration of a vehicle lower section structure according to a present exemplary embodiment. FIG. 1 is a plan view illustrating a vehicle lower section 10 applied with the vehicle lower section structure according to the present exemplary embodiment. FIG. 2 is a cross-section taken along line 2-2 in FIG. 1.

As illustrated in FIG. 1, a floor panel 12 extends in the vehicle width direction and the vehicle front-rear direction in the vehicle lower section 10. The floor panel 12 is provided with intermittently projecting beads 12A along the vehicle front-rear direction. Plural of the beads 12A are provided so as to form rows along the vehicle width direction. Forming the beads 12A increases the rigidity of the floor panel 12 itself.

Rockers 14, 16 respectively extend along the vehicle front-rear direction along both vehicle width direction edges of the floor panel 12. Above the floor panel 12, floor cross members (hereafter, referred to simply as "cross members") 18 span between the rocker 14 and the rocker 16 in the vehicle width direction. Note that each cross member 18 is disposed between beads 12A disposed at the front of the cross member 18 in the vehicle front-rear direction and beads 12A disposed at the rear of the cross member 18 in the vehicle front-rear direction.

As illustrated in FIG. 2, a battery pack (rechargeable battery) 20, serving as a drive power supply device for supplying electric power to a power unit such as a motor, is installed below the floor panel 12.

As described above, the rockers 14, 16 extend along the vehicle front-rear direction at both vehicle width direction edges of the floor panel 12. The rockers 14, 16 will be described later. Note that the rocker 16 has substantially the same configuration as the rocker 14, and so explanation thereof is omitted.

As illustrated in FIG. 2, in the present exemplary embodiment, the rocker 14 is configured including an outer section 22 positioned at the vehicle width direction outer side, and an inner section 24 positioned at the vehicle width direction inner side. The rocker 14 is, for example, formed from a metal such as an aluminum alloy, and the outer section 22 and the inner section 24 formed integrally to one another by extrusion, drawing, or the like. The outer section 22 and the inner section 24 form a closed cross-section section 26.

As taken along the vehicle width direction, the outer section 22 has a cross-section profile configured including an outer wall 22A, an oblique upper wall 22B, and an oblique lower wall 22C. The outer wall 22A is formed running in the vertical direction. The oblique upper wall 22B is provided above the outer wall 22A and is inclined upward on progression toward the vehicle width direction inner side. The oblique lower wall 22C is provided below the outer wall 22A and is inclined downward on progression toward the vehicle width direction inner side.

As taken along the vehicle width direction, the inner section 24 has a cross-section profile configured including an upper inner wall 24A and a lower inner wall 24B. The upper inner wall 24A is formed running in the vertical direction at an upper portion of the inner section 24. The lower inner wall 24B is formed running in the vehicle vertical direction at a lower portion of the inner section 24. The lower inner wall 24B is positioned further to the vehicle width direction inner side than the upper inner wall 24A. A lateral wall 24C formed running substantially along the horizontal direction is provided between the lower inner wall 24B and the upper inner wall 24A. The lateral wall 24C is thus formed so as to link the lower inner wall 24B and the upper inner wall 24A together.

An oblique upper wall 24D provided above the upper inner wall 24A is inclined upward on progression toward the vehicle width direction outer side. The oblique upper wall 24D is formed so as to link to the oblique upper wall 22B of the outer section 22. A flange 28 extends upward from an apex 27 where the oblique upper wall 24D of the inner section 24 is linked to the oblique upper wall 22B of the outer section 22. The flange 28 is joined to a lower end portion of a pillar, not illustrated in the drawings.

A bottom wall 24E formed running substantially along the horizontal direction toward the vehicle width direction outer side is provided below the lower inner wall 24B. The bottom wall 24E is formed so as to link to the oblique lower wall 22C of the outer section 22. Note that the bottom wall 24E allows fasteners 32 to be inserted. Fixing tabs 30 provided to the battery pack 20 are capable of being fastened and fixed to the rocker 14 by the fasteners 32.

As described above, the upper inner wall 24A of the inner section 24 is positioned further to the vehicle width direction outer side than the lower inner wall 24B. Accordingly, the upper portion 14A and a lower portion 14B of the rocker 14 configure closed cross-section sections having different areas. Namely, the area of a lower closed cross-section section 34 provided at the lower portion 14B side of the rocker 14 is greater than the area of an upper closed cross-section section 36 provided at the upper portion 14A side of the rocker 14. The rigidity of the lower portion 14B side of the rocker 14 is set higher than the rigidity of the upper portion 14A side of the rocker 14.

A ladder-shaped shock absorption section (second shock absorption section) 38 is provided inside the upper closed cross-section section 36 of the rocker 14. The shock absorption section 38 is disposed overlapping with the cross members 18 in vehicle side view. A ladder-shaped shock absorption section (first shock absorption section) 40 is formed inside the lower closed cross-section section 34 of the rocker 14. The shock absorption section 40 is disposed overlapping with the battery pack 20 in vehicle side view.

Explanation follows regarding the respective shock absorption sections 38, 40.

The shock absorption sections 38, 40 are integrally formed together with the outer section 22 and the inner section 24. The shock absorption section 38 includes an upper wall 38A spanning substantially in the horizontal direction (vehicle width direction) between the upper inner wall 24A of the inner section 24 and the outer wall 22A of the outer section 22. Below the upper wall 38A, a lower wall 38B is formed facing the upper wall 38A. The lower wall 38B is linked to the lateral wall 24C, and partitions the upper portion 14A from the lower portion 14B of the rocker 14. Plural (in this case, two) coupling walls 38C span in the vertical direction between the upper wall 38A and the lower wall 38B.

The shock absorption section 40 includes an upper wall 40A spanning substantially in the horizontal direction (vehicle width direction) between the lower inner wall 24B of the inner section 24 and the outer wall 22A of the outer section 22. Below the upper wall 40A, a lower wall 40B is formed facing the upper wall 40A. Plural (in this case, three) coupling walls 40C span in the vertical direction between the upper wall 40A and the lower wall 40B.

Operation and Advantageous Effects of the Vehicle Lower Section Structure

Next, explanation follows regarding operation and advantageous effects of the vehicle lower section structure according to the present exemplary embodiment.

As illustrated in FIG. 2, in the present exemplary embodiment, the outer section 22 and the inner section 24 are integrally formed in the rocker 14. The outer section 22 and the inner section 24 form the closed cross-section section 26.

Accordingly, although not illustrated in the drawings, the strength of the rockers can be increased in comparison to cases in which, for example, two panels configuring an outer section and an inner section are joined together. Moreover, welding, fastening, or the like would be necessary in order to join together two panels configuring an outer section and an inner section of a rocker. However, in the present exemplary embodiment, the outer section 22 and the inner section 24 are formed integrally to one another, rendering such work unnecessary, and thus enabling a commensurate reduction in costs.

Moreover, in the present exemplary embodiment, in the upper portion 14A of the rocker 14 (inside the upper closed cross-section section 36), the shock absorption section 38 spans in the vehicle width direction between the outer section 22 and the inner section 24 at a position overlapping with the cross members 18 in vehicle side view. Moreover, in the lower portion 14B of the rocker 14 (inside the lower closed cross-section section 34), the shock absorption section 40 spans in the vehicle width direction between the outer section 22 and the inner section 24 at a position overlapping with the battery pack 20 in vehicle side view.

Accordingly, in a vehicle side collision, when an impact load F is input to the rocker 14, part of the impact load F is transmitted to the cross members 18 through the shock absorption section 38 provided on the upper portion 14A side of the rocker 14 (as transmitted load F1), and part of the impact load F is transmitted to the battery pack 20 through the shock absorption section 40 provided on the lower portion 14B side of the rocker 14 (as transmitted load F2).

Then, when the impact load (transmitted load F1) is transmitted to the cross members 18 through the shock absorption section 38, a reaction force N1 is obtained by the rocker 14 from the cross members 18 (strictly speaking, through the cross members 18 from the rocker 16 on the opposite side to the rocker 14 to which the impact load F has been input) (see FIG. 1). Moreover, when the impact load (transmitted load F2) is transmitted to the battery pack 20 through the shock absorption section 40, a reaction force N2 from the battery pack 20 is obtained by the rocker 14. This causes the shock absorption sections 38, 40 to plastically deform, thus absorbing impact energy.

Note that, for example, as illustrated in FIG. 4A to FIG. 4D, in cases in which a shock absorption section configured by a shock absorption member 100 provided separately to the rocker 102, when fitting the shock absorption member 100 inside a closed cross-section section 104 of the rocker 102, it is necessary to provide movement restricting ribs 106 inside the closed cross-section section 104 in order to prevent the position of the shock absorption member 100 from shifting when subjected to impact.

Figure 4A:
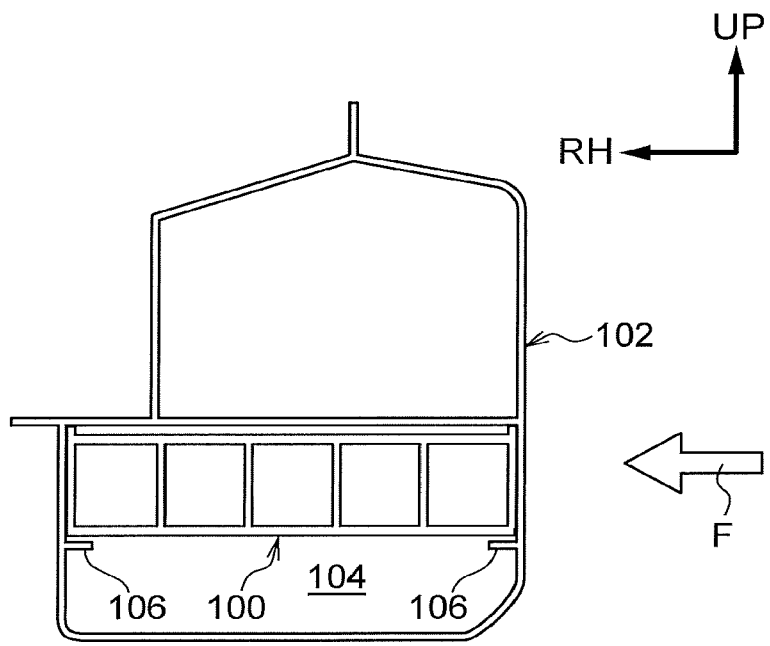
FIG. 4A to FIG. 4D are schematic views illustrating states in which impact load is input to a rocker of a vehicle of a comparative example in time sequence.
Figure 4B:
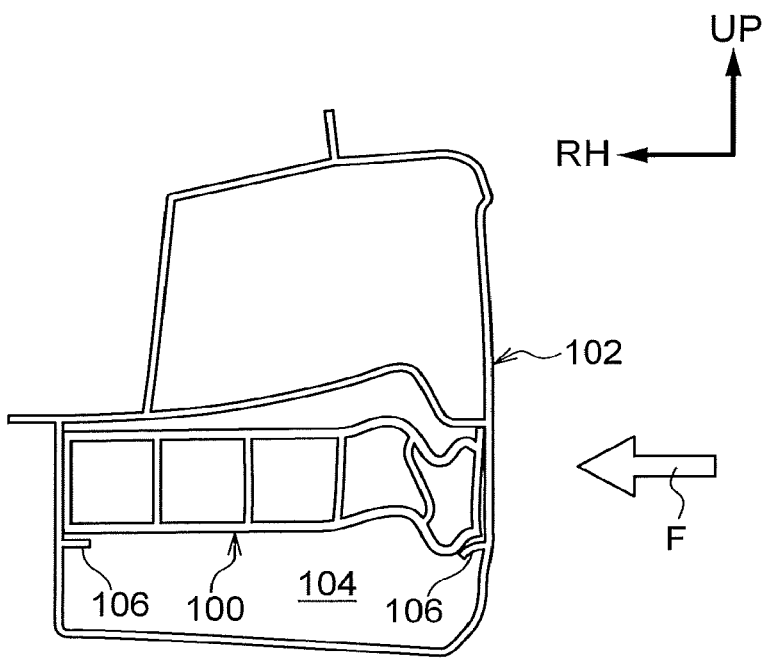
Figure 4C:
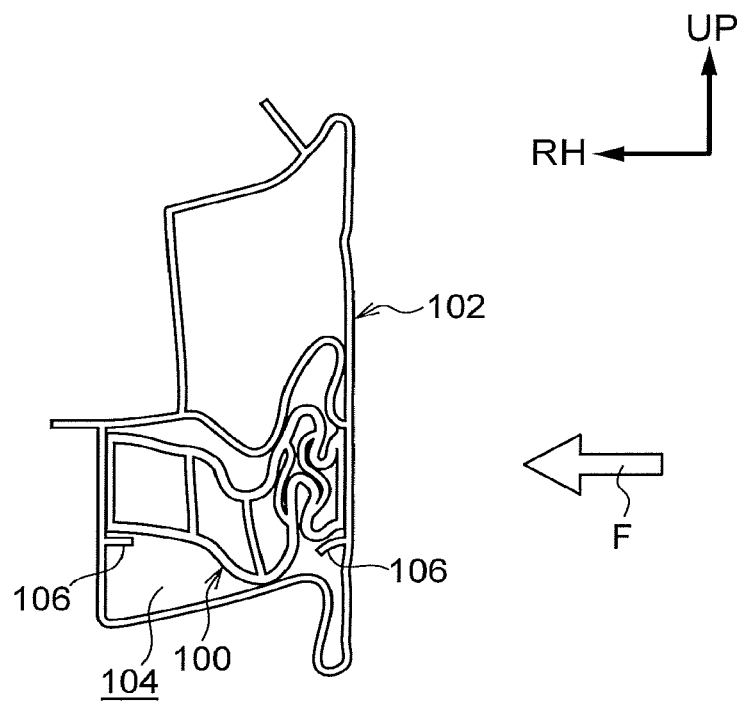
Figure 4D:
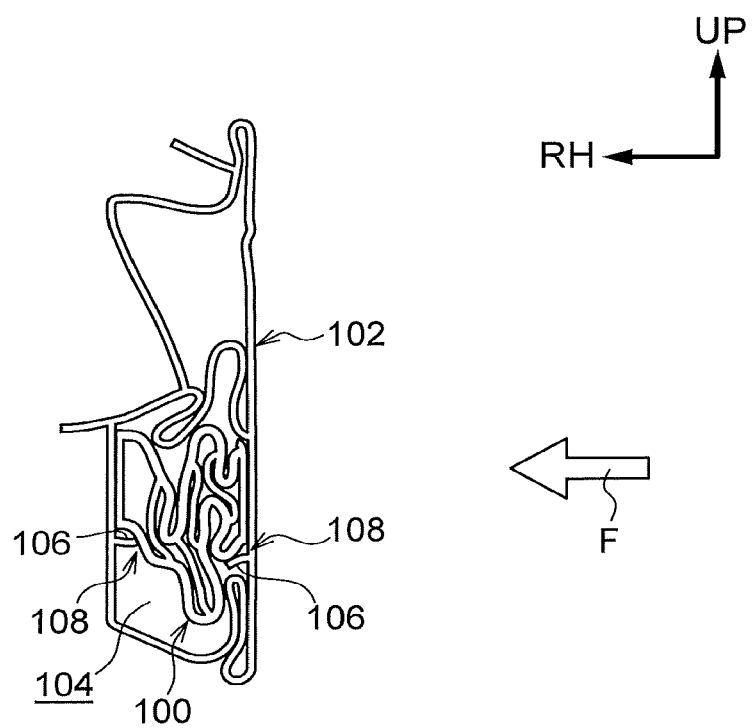

When the movement restricting ribs 106 are provided inside the closed cross-section section 104 of the rocker 102 in this manner, during plastic deformation of the shock absorption member 100 when the rocker 102 is input with impact load F, there is a possibility that, as illustrated in FIG. 4C and FIG. 4D, the ribs 106 might obstruct the plastic deformation of the shock absorption member 100.

When the plastic deformation of the shock absorption member 100 is obstructed in this manner, what may be referred to as incomplete crushing (an uncrushed portion 108) arises, resulting in a reduction in the amount of energy absorbed by the rocker 102 commensurate with the incomplete crushing. Namely, it might not be possible to absorb impact energy efficiently.

Figure 3A:
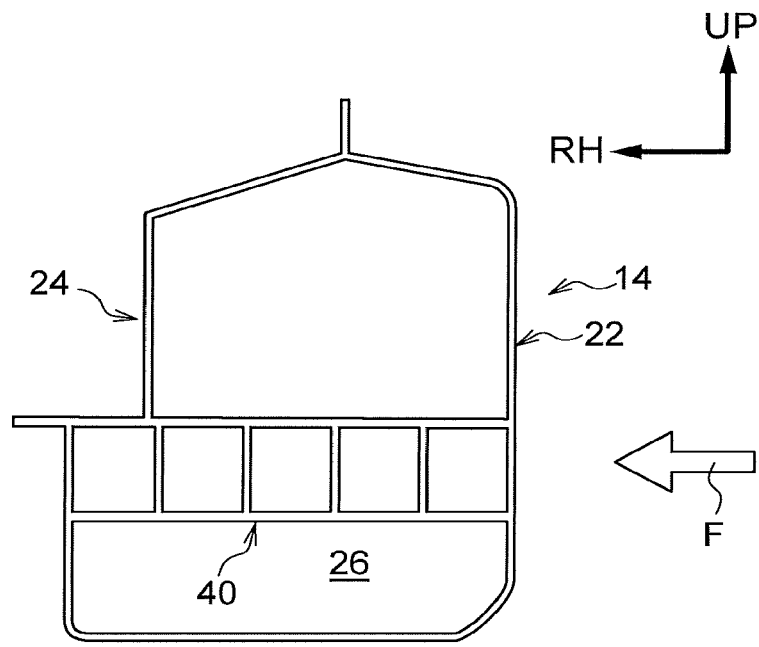
FIG. 3A to FIG. 3D are schematic views illustrating states in which impact load is input to a rocker of a vehicle applied with a vehicle lower section structure according to the first exemplary embodiment in time sequence.
Figure 3B:
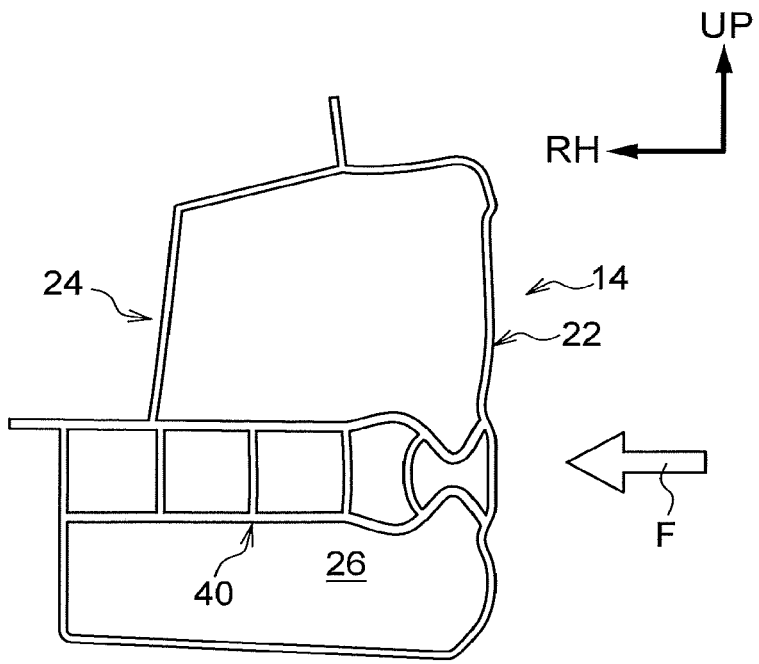
Figure 3C:
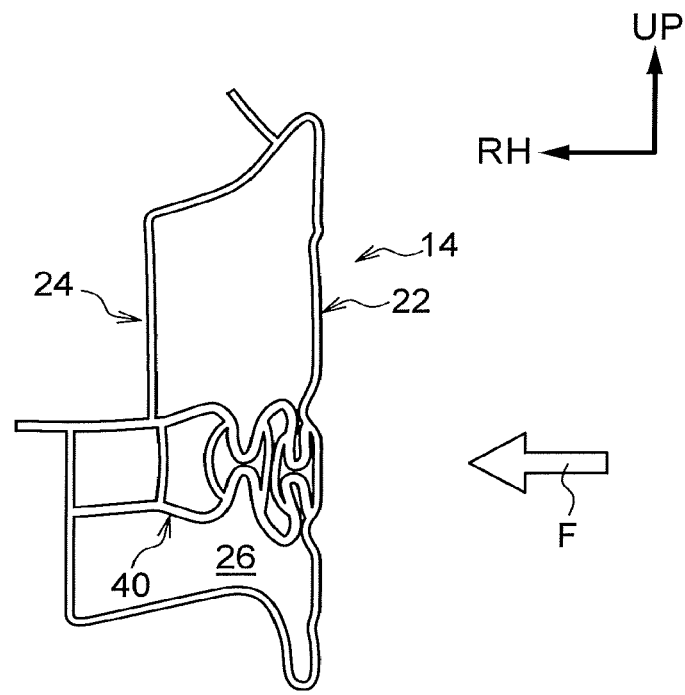
Figure 3D:
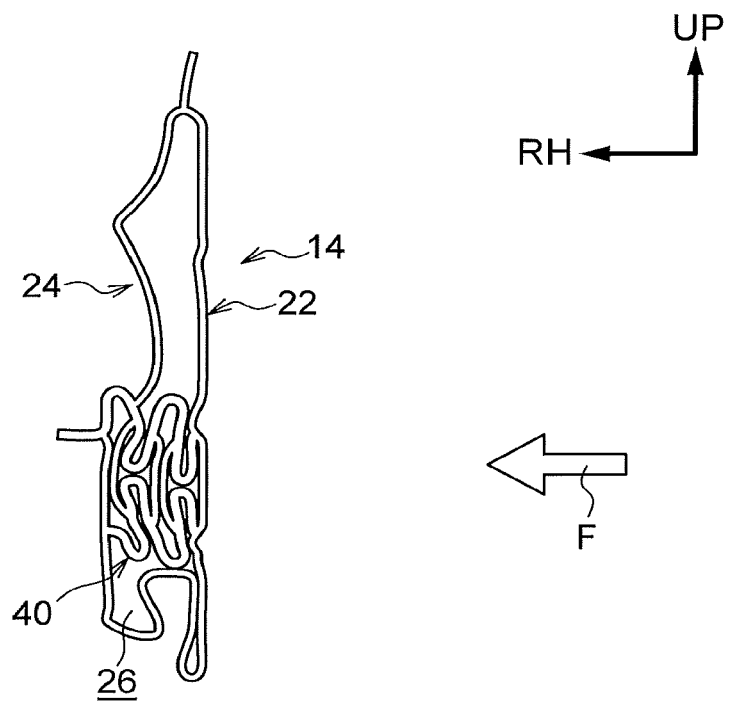

By contrast, in the present exemplary embodiment, as illustrated in FIG. 3A to FIG. 3D, the outer section 22 and the inner section 24 are integrally formed in the shock absorption section 40, and so there is no need to provide ribs or the like such as those illustrated in FIG. 4A. Accordingly, in the present exemplary embodiment, as illustrated in FIG. 3C and FIG. 3D, incomplete crushing of the shock absorption section 40 can be suppressed.

Namely, impact energy of the impact load F can be effectively absorbed, thereby enabling inward folding of the rocker 14 to be suppressed even when the rocker 14 is input with a large localized load, such as in a side collision with a pole. In other words, in the present exemplary embodiment, incomplete crushing of the shock absorption section 40 is suppressed, thereby enabling even more effective impact energy absorption, and enabling inward folding of the rocker 14 to be suppressed.

Note that in the present exemplary embodiment, as illustrated in FIG. 2, the shock absorption sections 38, 40 are provided inside the closed cross-section section 26 of the rocker 14. However, in FIG. 3A to FIG. 3D, only the shock absorption section 40 is illustrated inside the closed cross-section section 26 of the rocker 14, so as to correspond to the configuration of the comparative example illustrated in FIG. 4A to FIG. 4D. Both the shock absorption section 38 and the shock absorption section 40 of the present exemplary embodiment can be said to be substantially the same as each other, and so the shock absorption section 38 is omitted from illustration.

Note that in the present exemplary embodiment illustrated in FIG. 2, as described above, in a vehicle side collision, when the impact load F is input to the rocker 14, part of the impact load F is transmitted to the cross members 18 through the shock absorption section 38 provided on the upper portion 14A side of the rocker 14 (transmitted load F1), and part of the impact load F is transmitted to the battery pack 20 through the shock absorption section 40 provided on the lower portion 14B side of the rocker 14 (transmitted load F2).

Namely, both a load transmission route A transmitting load to the cross members 18 through the shock absorption section 38 of the rocker 14, and a load transmission route B transmitting load to the battery pack 20 through the shock absorption section 40 of the rocker 14, are formed. This thereby enables the impact load F input to the rocker 14 to be dispersed, and also enables the proportions of load borne by the upper portion 14A of the rocker 14 and the lower portion 14B of the rocker 14 to be modified.

Accordingly, the transmitted load F2 that is transmitted to the battery pack 20 installed below the floor panel 12 can be reduced. This enables, for example, the rigidity of the battery pack 20 to be lowered by an amount commensurate with the reduction in the transmitted load F2 that is transmitted to the battery pack 20. So doing enables the plate thickness of the battery pack 20 to be made thinner, enabling a reduction in the weight of the battery pack 20. Moreover, the installed capacity of a battery module 20A housed in the battery pack 20 can be increased by an amount commensurate with reducing the plate thickness of the battery pack 20.

Supplementary Points Regarding the Present Exemplary Embodiment

In the present exemplary embodiment, both the shock absorption section 38 and the shock absorption section 40 are formed in a ladder shape. However, the shapes of the shock absorption section 38 and the shock absorption section 40 are not limited thereto. For example, the shapes thereof may be modified as appropriate according to the plate thickness. For example, the plate thickness may be thinned and a honeycomb shape formed. Moreover, the shock absorption section 38 and the shock absorption section 40 may have different plate thicknesses to each other. There is no need for the shock absorption section 38 and the shock absorption section 40 to have the same shape as each other.

Moreover, in the present exemplary embodiment, in the rocker 14, the shock absorption section 38 is provided at a position overlapping with the cross members 18 in vehicle side view, and the shock absorption section 40 is provided at a position overlapping with the battery pack 20 in vehicle side view. However, exemplary embodiments applicable to the present disclosure are not limited thereto.

Figure 5:
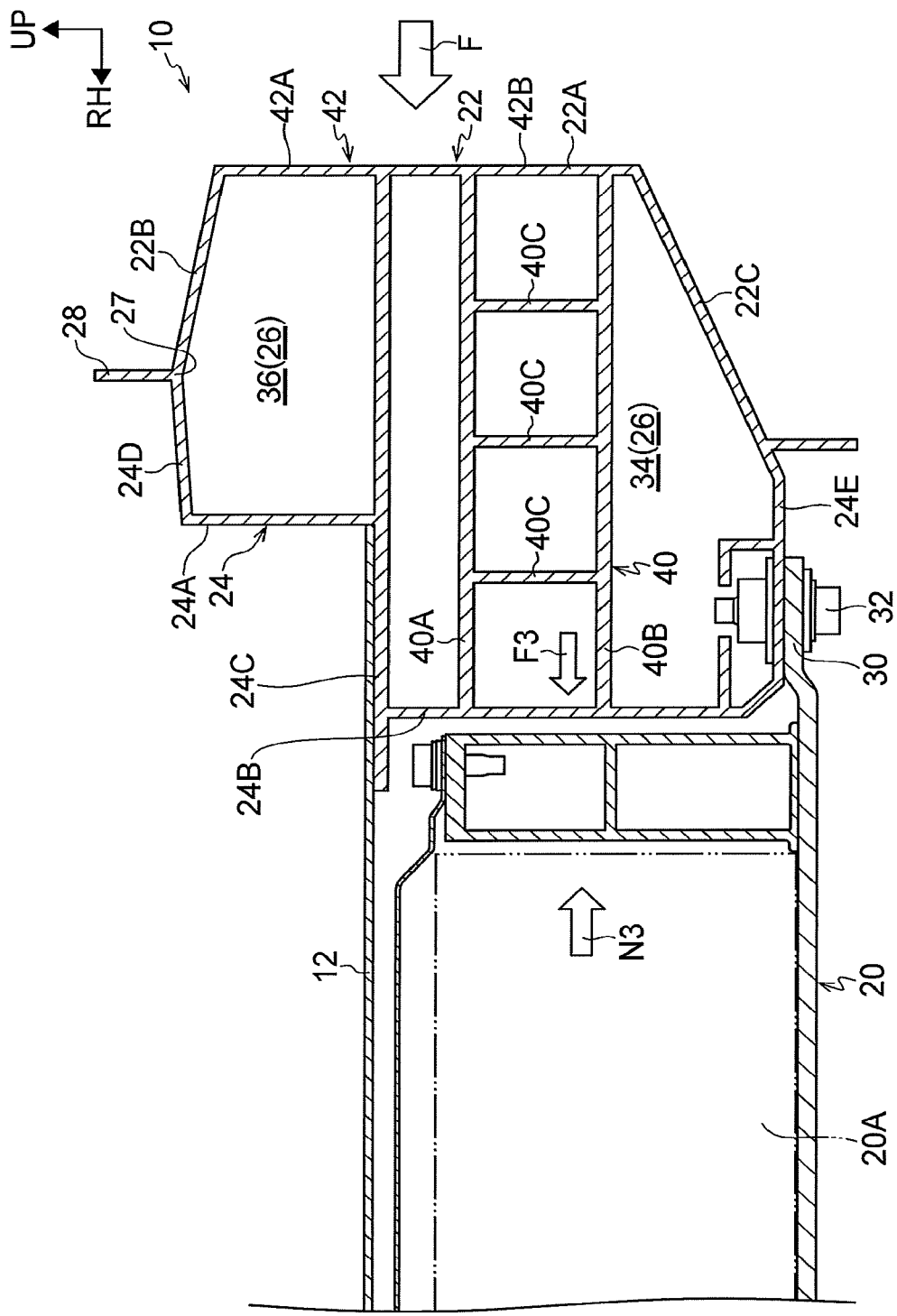
FIG. 5 is a cross-section corresponding to FIG. 2, illustrating a modified example of a vehicle lower section structure according to the first exemplary embodiment.

For example, as illustrated in FIG. 5, some vehicle models are not provided with the cross members 18 (see FIG. 2) above the floor panel 12. In such cases, a shock absorption section that would overlap with the cross members 18 (see FIG. 2) in vehicle side view is not provided on an upper section 42A side of a rocker 42. Accordingly, a shock absorption section (first shock absorption section) 40 is provided on a lower section 42B side of the rocker 42. In a vehicle side collision, when impact load F is input to the rocker 14, part of the impact load F is transmitted to the battery pack 20 through the shock absorption section 40 (transmitted load F3).

When impact load (transmitted load F3) is transmitted to the battery pack 20 through the shock absorption section 40, a reaction force N3 from the battery pack 20 is obtained by the rocker 14. This causes the shock absorption section 40 to plastically deform, such that impact energy is also absorbed in such cases.

Second Exemplary Embodiment

Figure 6:
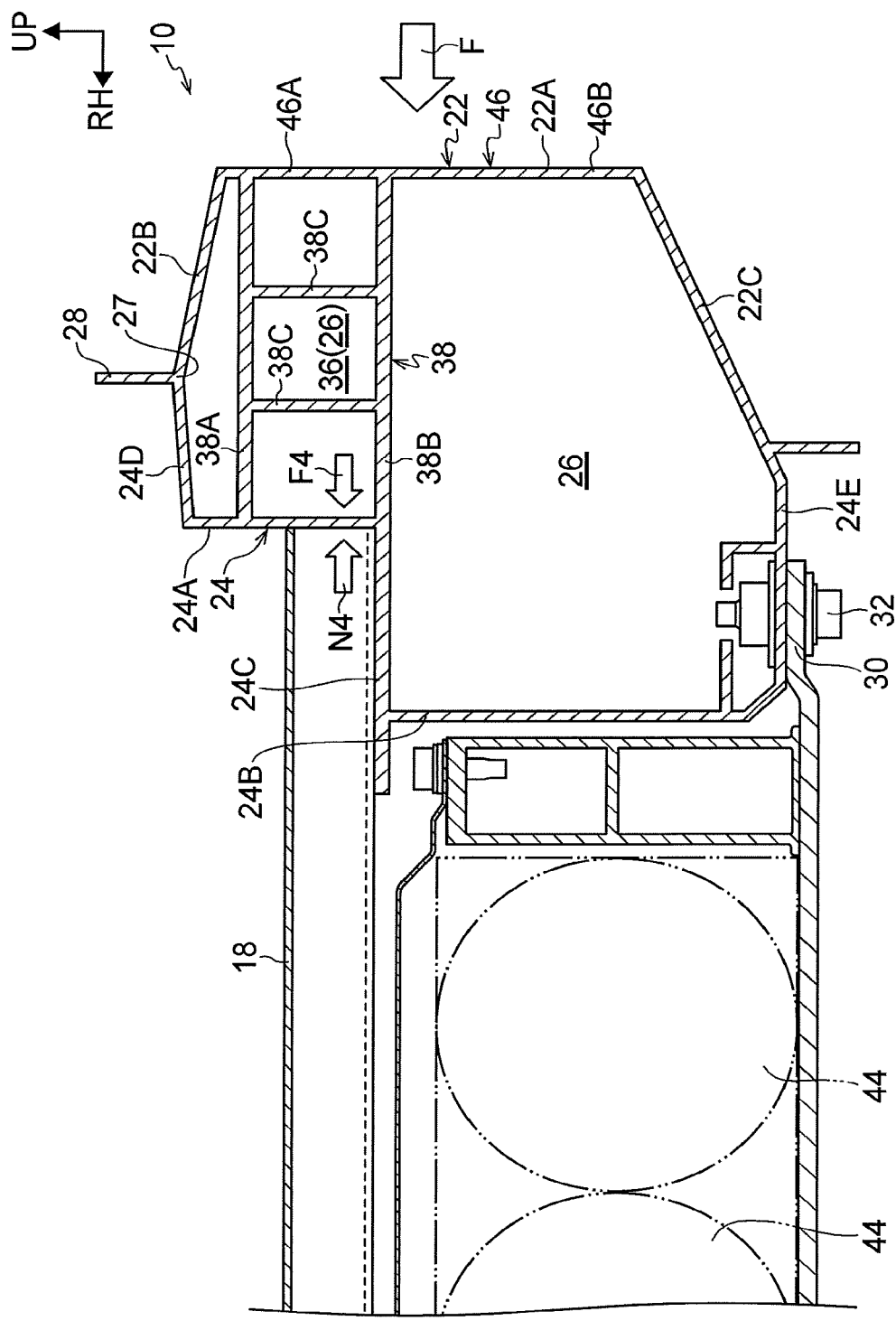
FIG. 6 is a cross-section corresponding to FIG. 2, illustrating a vehicle lower section structure according to a second exemplary embodiment.

In the first exemplary embodiment above, explanation has been given regarding a case in which the battery pack 20 (see FIG. 2) is employed as a drive power supply device that supplies electric power to the power unit. However, in the present exemplary embodiment, as illustrated in FIG. 6, explanation is given regarding a case in which a fuel cell configured by hydrogen tanks 44 is employed as the drive power supply device. Note that explanation regarding configurations substantially the same as those of the first exemplary embodiment is omitted. Exemplary embodiments applicable to the present disclosure are not limited hereto.

Note that in a vehicle side collision, impact load input to the rocker is transmitted to floor cross members provided above the floor panel. This is desirable in cases in which the fuel cell is installed on the vehicle lower side of a floor panel since it allows for impact load to not be input to the fuel cell.

As illustrated in FIG. 6, in the present exemplary embodiment, the shock absorption section 38 is provided at a position in a rocker 46 that does not overlap with hydrogen tanks 44 in vehicle side view (on an upper section 46A side of the rocker 46).

In this case, in a vehicle side collision, when impact load F is input to the rocker 46, part of the impact load F is transmitted to the cross members 18 through the shock absorption section 38 provided on the upper section 46A side of the rocker 46 (transmitted load F4). When the impact load (transmitted load F4) is transmitted to the cross members 18 through the shock absorption section 38, a reaction force N4 is obtained by the rocker 46 from the cross members 18. This causes the shock absorption section 38 to plastically deform, thereby absorbing impact energy.

Namely, the impact load F can be reduced even with a short stroke, enabling the rocker 46 to be suppressed from intruding toward the vehicle width direction inner side. Moreover, the present exemplary embodiment enables configuration to be made such that the impact load F is not input to the hydrogen tanks 44 installed below the floor panel 12.

Supplementary Points Regarding the Present Exemplary Embodiment

Figure 7:
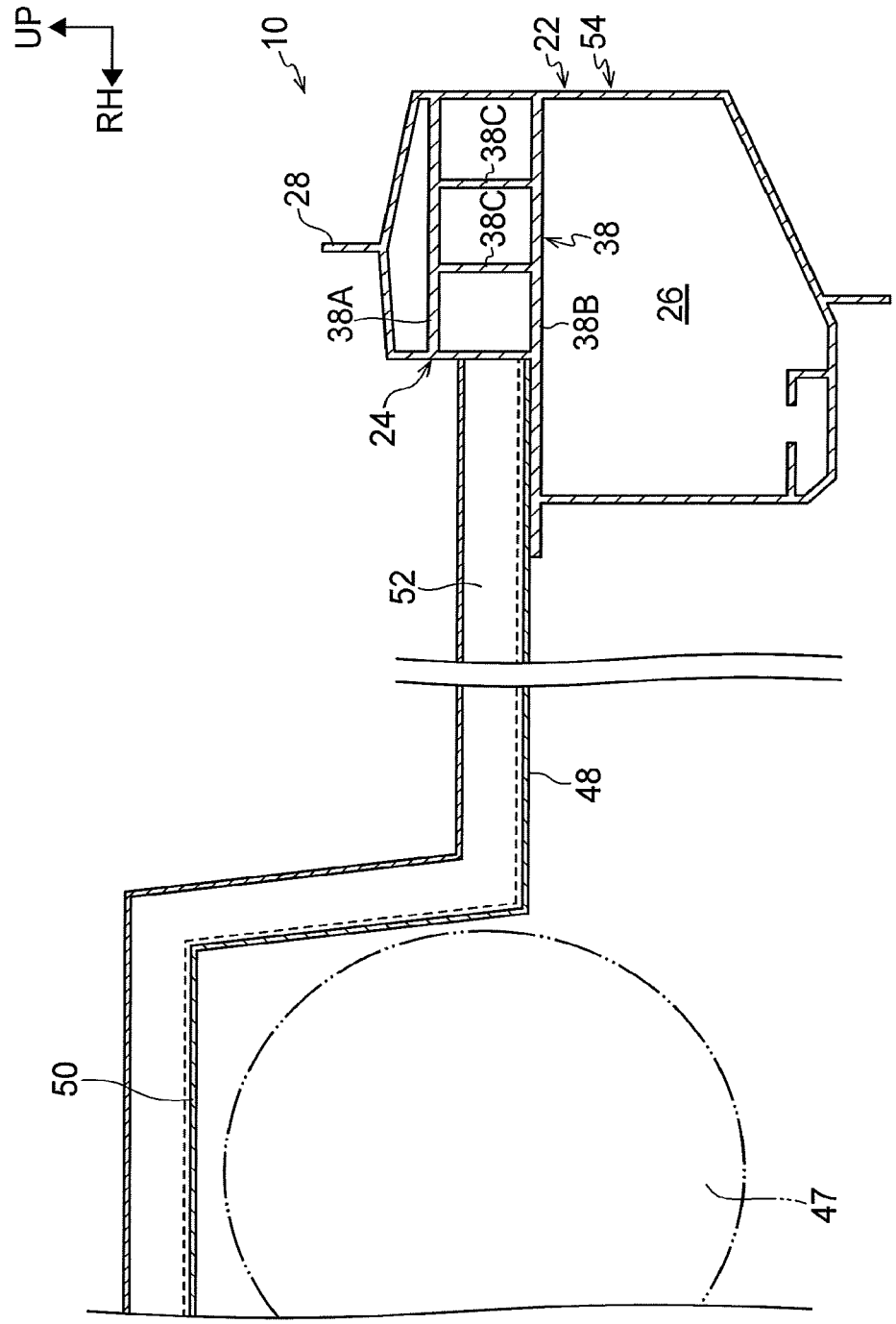
FIG. 7 is a cross-section corresponding to FIG. 2, illustrating a first modified example of a vehicle lower section structure according to the second exemplary embodiment.

In the exemplary embodiment described above, the cross members 18 span between the rockers 14, 16 as illustrated in FIG. 1. However, as illustrated in FIG. 7, for example, in cases in which a hydrogen tank 47 has a large diameter, the hydrogen tank 47 is sometimes installed running in the vehicle front-rear direction below a projecting tunnel section 50 running in the vehicle front-rear direction at a vehicle width direction central portion of a floor panel 48.

In such cases, a cross member 52 spans between a pair of rockers 54 installed at both vehicle width direction edges of the floor panel 48 at a separation from the tunnel section 50. In this example, the cross member 52 is formed in a shape following the tunnel section 50. However, there is no limitation thereto.

For example, although not illustrated in the drawings, a cross member may be split about the tunnel section, being provided in two parts running in the vehicle width direction. Note that in such cases, one length direction end of each cross member is joined to a rocker, and the other length direction end of each cross member is joined to the tunnel section. Accordingly, impact load transmitted to the cross member from the rocker obtains a reaction force from the tunnel section.

In the exemplary embodiments described above, explanation has been given regarding vehicles in which the battery pack 20 (see FIG. 2) or the hydrogen tanks 44 (see FIG. 6) are employed as the drive power supply device. However, these exemplary embodiments may also be applied to gasoline-driven vehicles.

Figure 8:
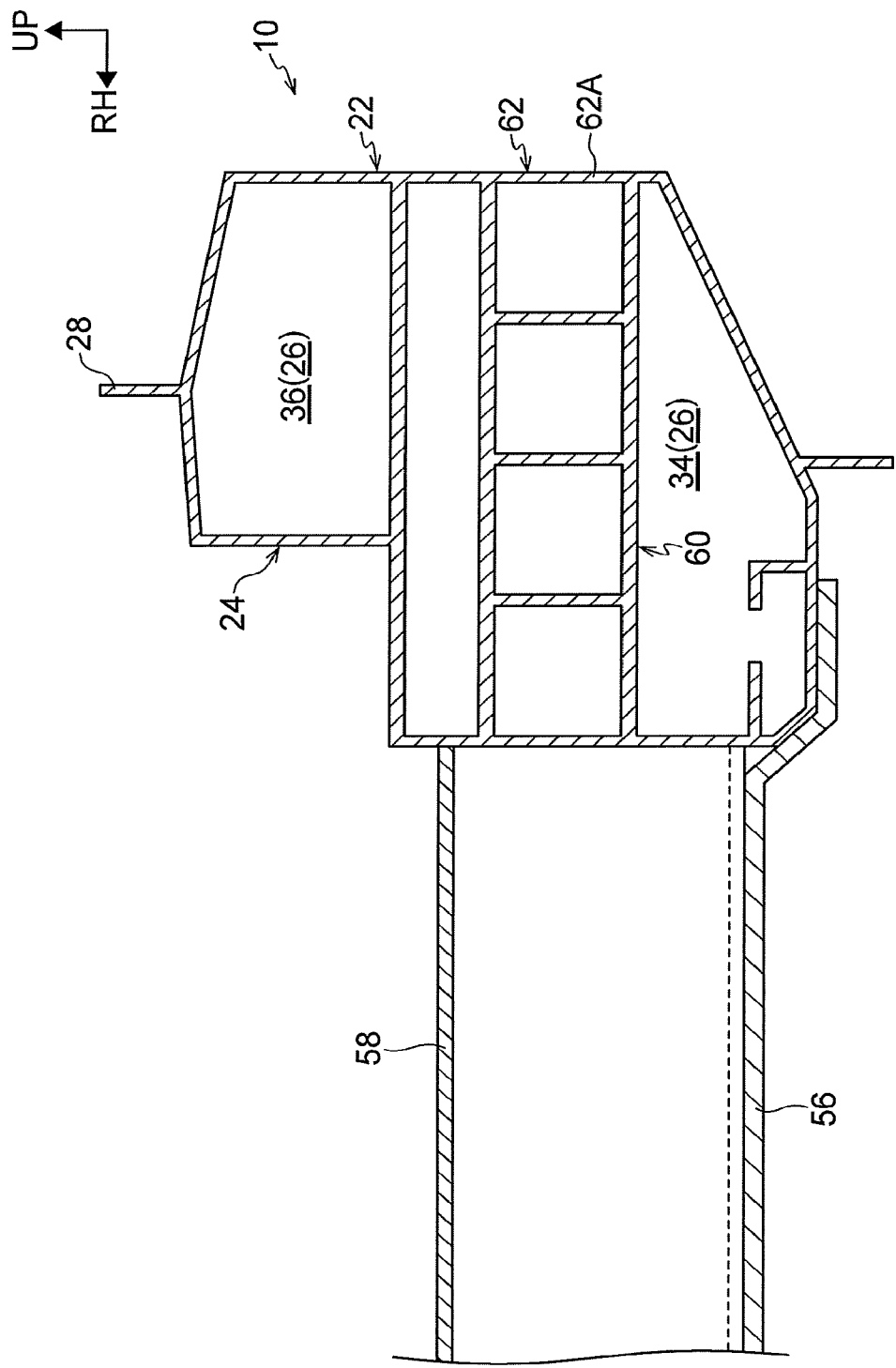
FIG. 8 is a cross-section corresponding to FIG. 2, illustrating a second modified example of a vehicle lower section structure according to the second exemplary embodiment.

Note that in the case of gasoline-driven vehicles, as illustrated in FIG. 8, for example, there is no need to install a drive power supply device below a floor panel 56. The position of the floor panel 56 in the vertical direction can thus be set lower. Accordingly, a shock absorption section (first shock absorption section) 60 is provided on a lower portion 62A side of a rocker 62 so as to overlap with a cross member 58 installed above the floor panel 56 in vehicle side view.

Explanation has been given regarding examples of exemplary embodiments of the present disclosure. However, exemplary embodiments of the present disclosure are not limited to the above, and obviously the exemplary embodiments and various modified examples may be combined as appropriate to implement various embodiments within a range not departing from the spirit of the present disclosure.

What is claimed is:

1. A vehicle lower section structure, comprising:
a pair of rockers respectively at both vehicle width direction outer sides of a floor panel of a vehicle so as to extend in a vehicle front-rear direction, each of the rockers including:
an outer section that is positioned at the vehicle width direction outer side;
an inner section that is integrally formed with the outer section, that is positioned at a vehicle width direction inner side, that forms a closed cross-section section together with the outer section, that is joined to the floor panel, that includes an upper inner wall and a lower inner wall positioned toward the vehicle width direction inner side with respect to the upper inner wall, and that includes a lateral wall positioned between the upper inner wall and the lower inner wall;
a first shock absorption section that includes a first upper wall and a first lower wall which are each integrally formed with the outer section and the upper inner wall, which each span in a vehicle width direction between the outer section and the upper inner wall within the closed cross-section section of the rocker, which are each within the closed cross-section of the rocker, the first lower wall is continuously linked to the lateral wall in the vehicle width direction, and the first upper wall is parallel to the first lower wall;
a second shock absorption section that includes a second upper wall and a second lower wall which are each integrally formed with the outer section and the lower inner wall, which each span in the vehicle width direction between the outer section and the lower inner wall within the closed cross-section section, which are each within the closed cross-section of the rocker, the second upper wall spanning parallel to the first lower wall and is spaced from the first lower wall,
wherein a floor cross member is above the floor panel so as to span between the pair of rockers in the vehicle width direction, and the first shock absorption section is at a position overlapping with the floor cross member in vehicle side view, and
wherein a storage battery is at a vehicle lower side of the floor panel, and the second shock absorption section is at a position overlapping with the storage battery in the vehicle side view.

2. The vehicle lower section structure of claim 1, wherein the first shock absorption section includes first coupling walls that each span in a vehicle height direction between the first upper wall and the first lower wall, and
wherein the second shock absorption section includes second coupling walls that each span in the vehicle height direction between the second upper wall and the second lower wall.

\* \* \* \* \*